Dec. 8, 1931.  A. H. McINTYRE  1,835,889
FRUIT GRADING OR SORTING MACHINE
Filed March 13, 1929   6 Sheets-Sheet 1
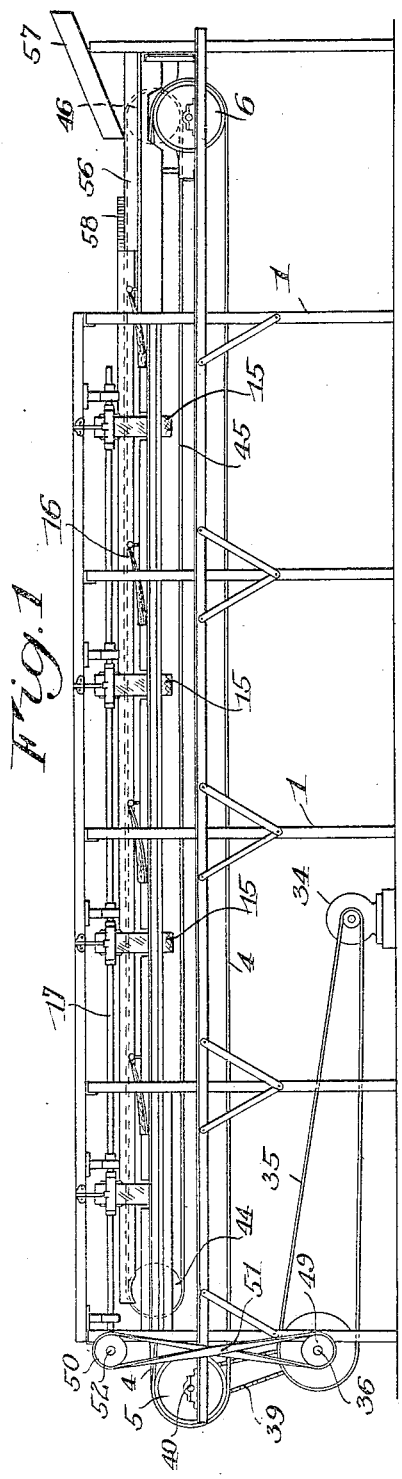

Dec. 8, 1931.  A. H. McINTYRE  1,835,889
FRUIT GRADING OR SORTING MACHINE
Filed March 13, 1929    6 Sheets-Sheet 2
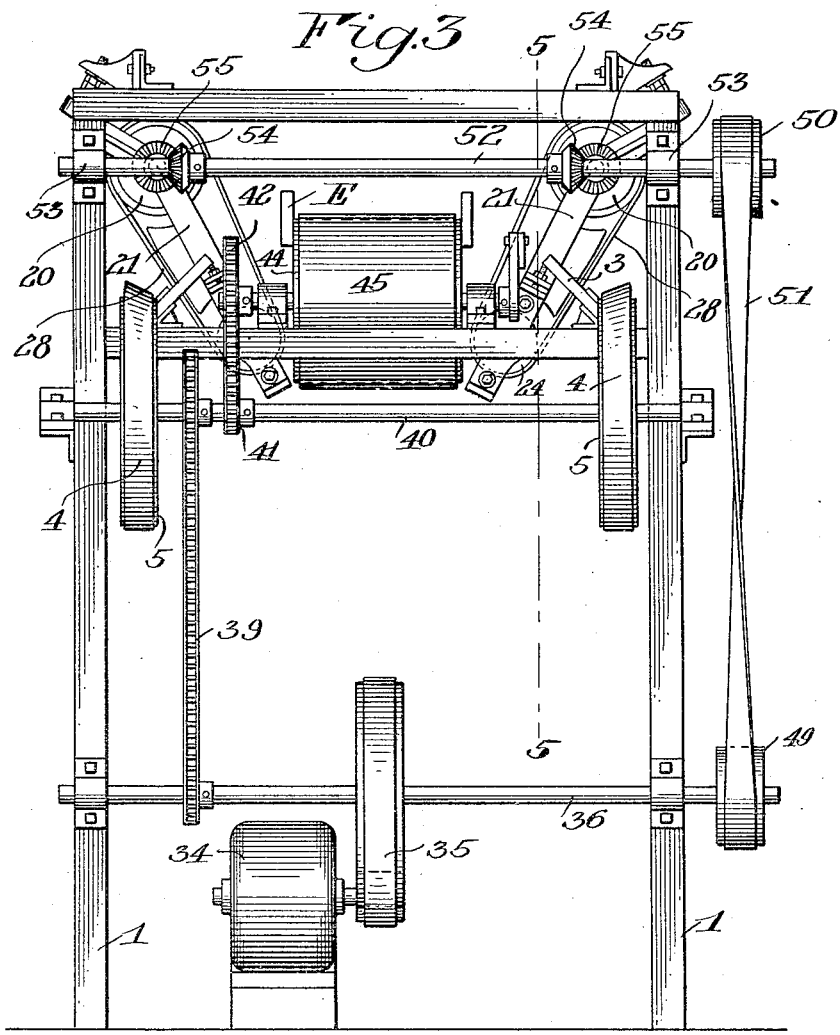
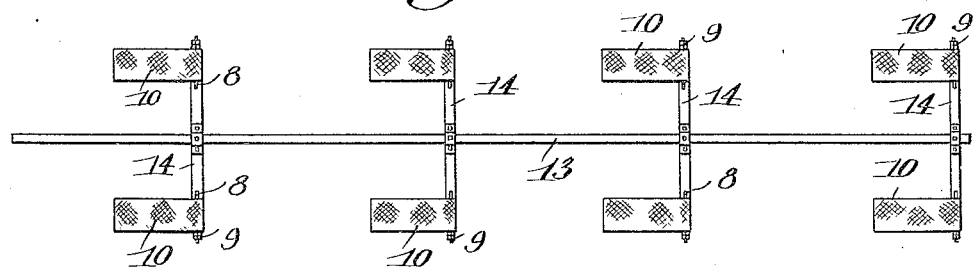

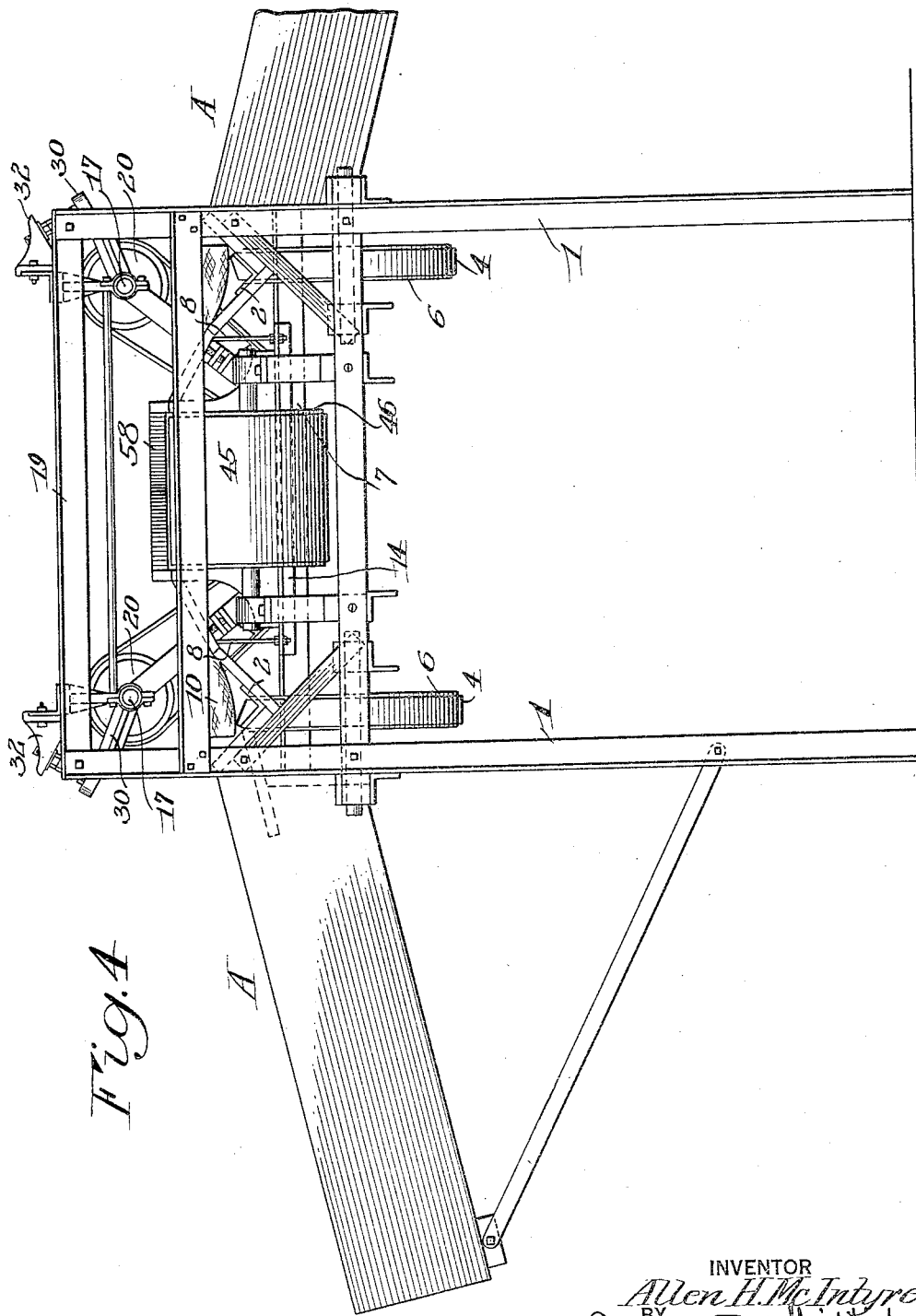

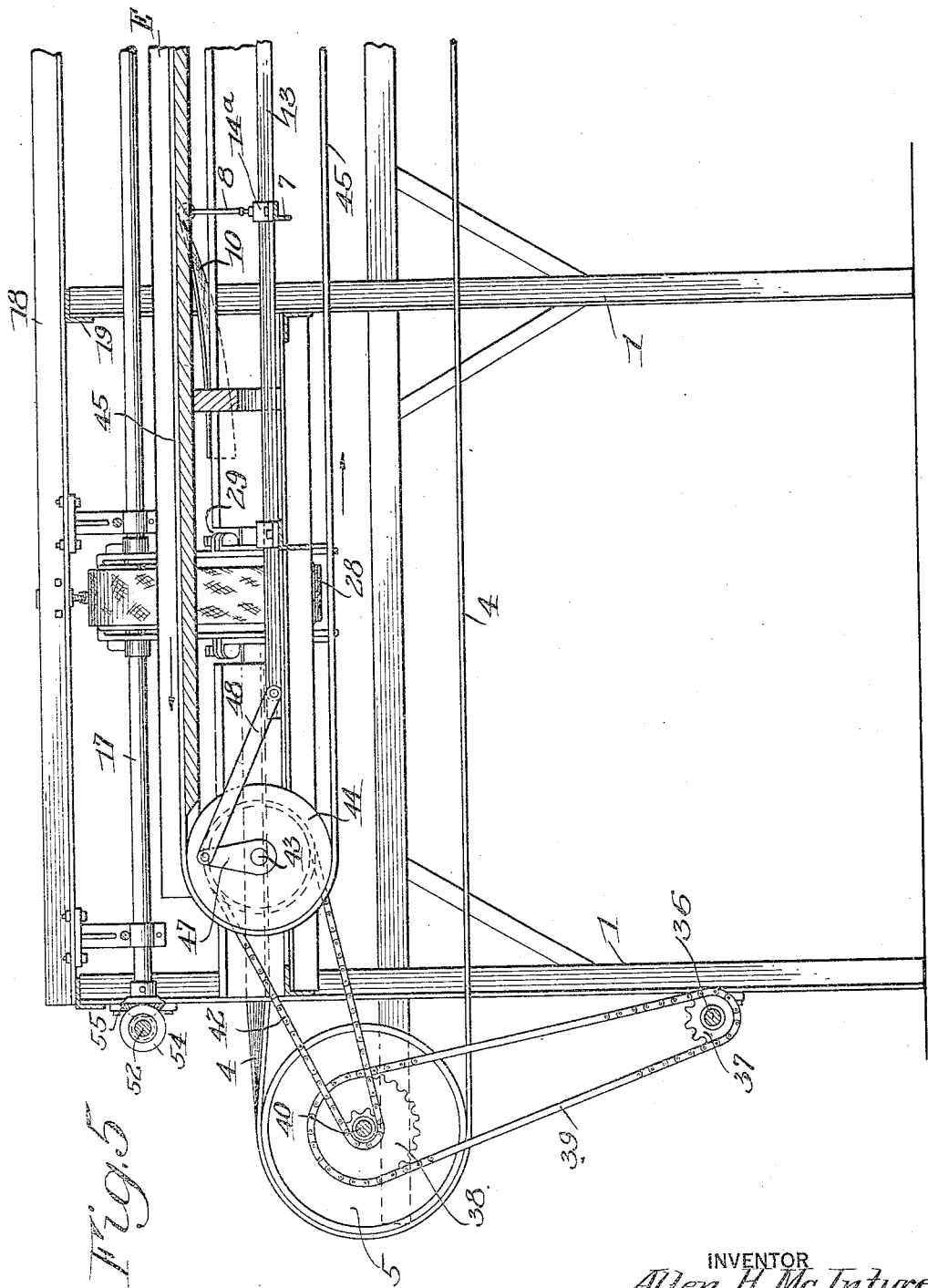

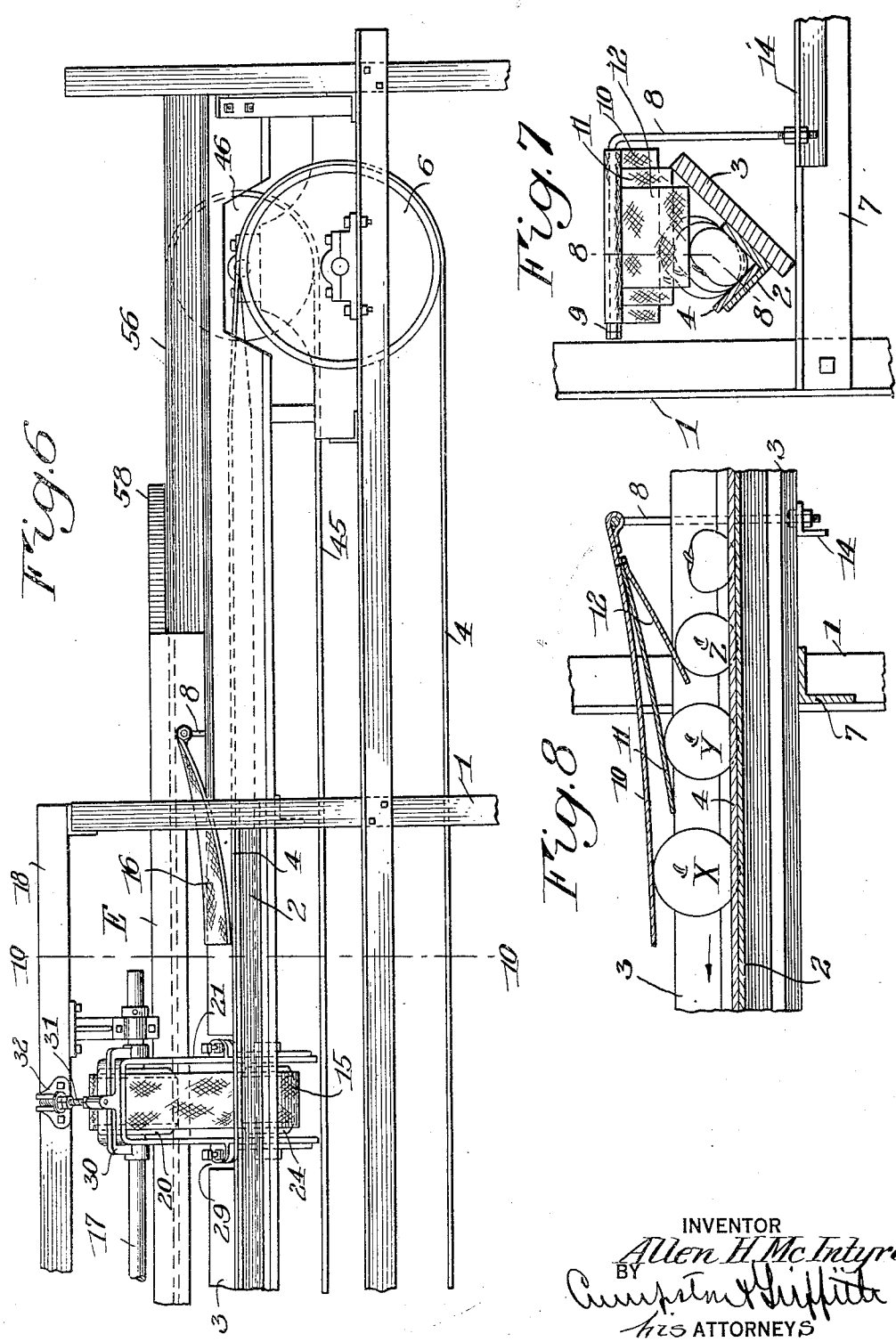

Dec. 8, 1931.  A. H. McINTYRE  1,835,889
FRUIT GRADING OR SORTING MACHINE
Filed March 13, 1929   6 Sheets-Sheet 6
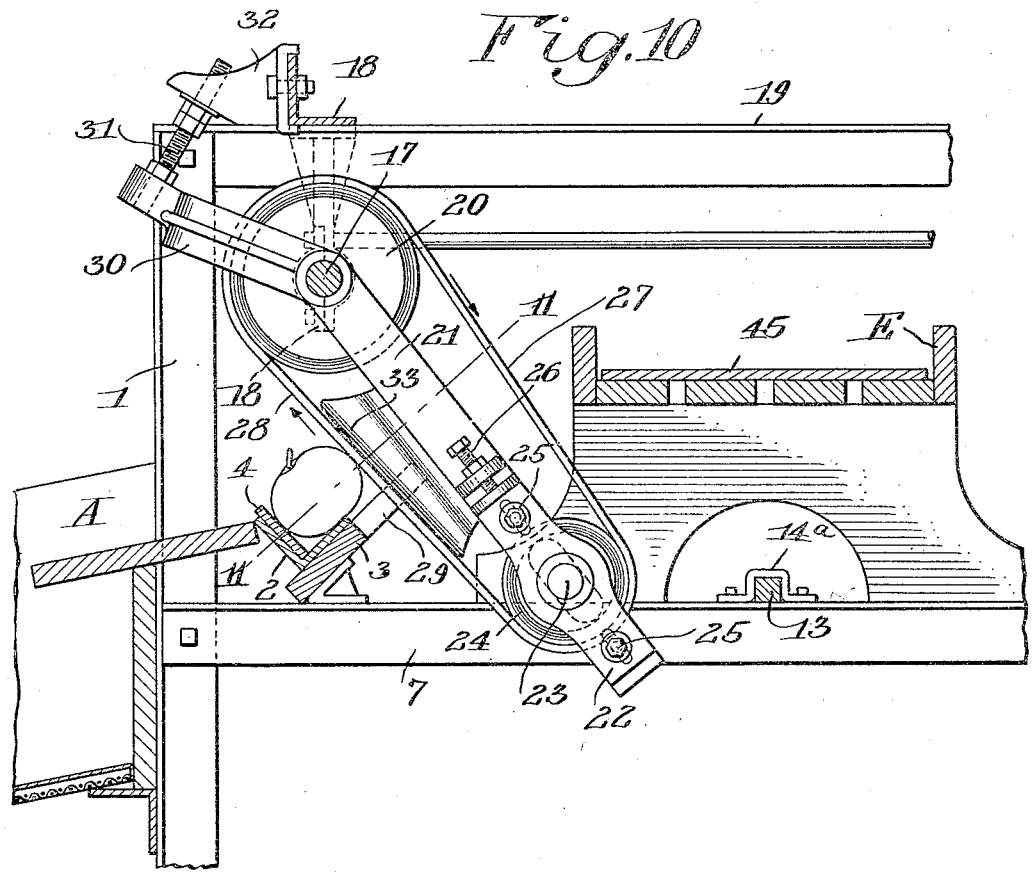
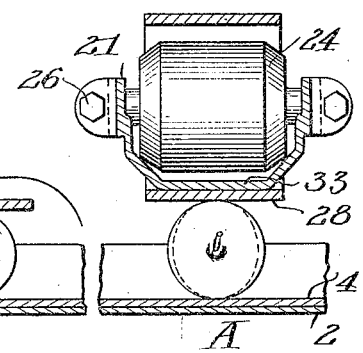
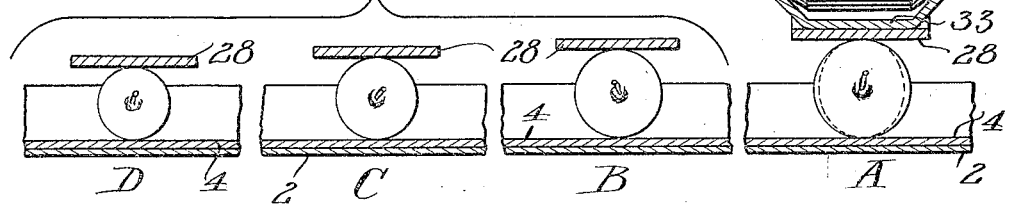
INVENTOR
Allen H. McIntyre
BY
his ATTORNEYS Patented Dec. 8, 1931

1,835,889

UNITED STATES PATENT OFFICE

ALLEN H. McINTYRE, OF WINCHESTER, VIRGINIA, ASSIGNOR OF ONE-HALF TO F. B. PEASE COMPANY, OF ROCHESTER, NEW YORK, A CORPORATION OF NEW YORK

FRUIT GRADING OR SORTING MACHINE

Application filed March 13, 1929. Serial No. 346,644.

My present invention relates to grading and sorting machines and more particularly to fruit grading machines and it has for its object to provide a simple, efficient, durable and quiet running machine that will rapidly handle the work and with convenience to the operator. The improvements are directed in part to the means for "up-edging" fruits such as apples, which have widely different diameters on different axes besides varying in shape as well as size, and to the means for selecting the various sizes and dividing them into grades on the basis of their greatest diameters.

To these and other ends the invention resides in certain improvements and combinations of parts, all as will be hereinafter more fully described, the novel features being pointed out in the claims at the end of the specification.

In the drawings:

Fig. 1 is a side elevation of a grading or sorting machine constructed in accordance with and illustrating one embodiment of my invention;

Fig. 2 is a top plan view thereof;

Fig. 3 is an enlarged end view of what may be termed the delivery and driving end of the machine, the receiving tables being omitted;

Fig. 4 is an enlarged elevation of the opposite or receiving end of the machine, one of the receiving tables being broken away;

Fig. 5 is an enlarged fragmentary section taken vertically through the receiving end of the machine on substantially the line 5—5 of Fig. 3;

Fig. 6 is a fragmentary enlarged side elevation of the receiving end of the machine;

Fig. 7 is a further enlarged fragmentary detail taken in transverse section through one of the apple runway troughs;

Fig. 8 is a section taken on the line 8—8 of Fig. 7;

Fig. 9 is a detail plan view of a section of the up-edging frame;

Fig. 10 is an enlarged section taken on the line 10—10 of Fig. 6, showing a selecting element in side elevation;

Fig. 11 is a section on the line 11—11 of Fig. 10, and

Fig. 12 is a collective view comprising different sections similar to Fig. 11 illustrative of the manner in which successive selector belts operate upon the fruit.

Similar reference numerals throughout the several views indicate the same parts.

It will be understood at the outset that while, as before stated, the machine of the present invention is particularly adapted for use in grading apples because of the peculiar characteristics of the shapes in which they grow and the machine will be described, as it has been illustrated, with particular reference to the grading of apples, nevertheless it may be used for other fruits and vegetables, particularly those which vary in diameter on different axes.

The size of an apple for grading purposes is generally accepted on the basis of its diameter in a plane transverse to the axis established by its stem and blow ends regardless of its diameter through that axis. Hence it is necessary to right the apple so that, in presenting it to the selector for removal or ejection it will, uniformly with the rest of the apples, occupy a position in which the first mentioned greater diameter is worked upon. If an apple is thrown rolling along a pavement or similar plane surface it will tumble and spin until, if the force of its travel is sufficient, it finally obtains traction and rolls smoothly on the roundness of its greatest diameter; that is, on its side and rotating on the axis, approximately, of its stem and blow. This is because such position is the line of least resistance for it and the friction against its flatter ends ultimately forces it to that position.

The machine of my present invention utilizes this principle, means being provided for causing the apples to travel with a rolling and tumbling motion along a runway while resistant friction is supplied in opposition thereto by elements which I will call "up-edgers," resulting in the same righting of the fruit. It thus passes to selectors successively adapted to respectively function only upon apples of a certain maximum diameter.

In the machine illustrated, there is really comprised as its two halves two complete sorting machines working together and designed to produce five grades of apples. Hence, a description of one side will suffice for both. Further, each side, with reference to the respective grades, is a duplication of up-edging and grading element groups differing only in the adjustment of the selector for a particular size wherefore a description of one of these groups will suffice for all.

Referring more particularly to the drawings 1 indicates the framework of the machine (Figs. 1 and 2) and 2 the runways along which the apples travel in the direction indicated by the arrows. A, B, C, and D are laterally supported receiving tables for respectively catching the apples of these grades, A, of course, being larger and finer fruit. The culls are accommodated in runway E to be later described. The runway 2 as shown in section in Figs. 7 and 10, for instance, preferably consists of a V-shaped trough supported on a bracket board 3 and along the inner face of the outer wall of which slides an endless belt 4 traveling in the direction of the arrows running over pulleys 5 and 6. Apples delivered into this trough in the manner hereinafter explained thus travel along in rolling contact with this belt and in frictional contact with the opposite wall of the trough as best seen in Figs. 7 and 8. This diversity of contact itself has a tendency to up-edge the apples, but this is accomplished more quickly by a light pressure on the apple from above in furtherance of its mere gravitational contact. For this purpose I arrange upon the cross piece 7 of the frame 1, whereon the runway supporting bracket 3 is arranged, a bracket 8 having a horizontal portion 9 on which is secured a plurality of up-edging contact fingers 10, 11 and 12 which trail or extend longitudinally of the runway and directly above the frame. They preferably consist of pliable canvas strips superposed one upon another as clearly shown in Fig. 8, the under ones being progressively shorter than those that overlie it. In this way, still referring to Fig. 8 the several tongues can simultaneously contact with successive apples of different sizes which are following each other along in close proximity. Otherwise the tongue or finger 10 in contact with apple X would, because of the size of the latter, be prevented from operating upon the succeeding smaller apples Y and Z. This is just the frictional contact needed in connection with the traveling belt 4 and the stationary wall of the trough to right each and every apple quickly and expeditiously before it reaches the zone of the selector and grader element.

Additionally I provide for the agitation of the apples in the trough or runway and on the belt to prevent them from piling up or jamming, and I do this through the medium of these up-edging fingers. To this end the brackets 8 are not mounted directly upon or fixed to the cross pieces 7 of the frame, but are mounted upon a frame 13 shown in detail in Fig. 9 that reciprocates in guides 14 (Fig. 10) through the action of the mechanism hereinafter described. Cross bars 14 on the frame carry the up-edging fingers.

The construction and mode of operation of the selecting and grading elements which are generally indicated at 15 in the more comprehensive figures (the up-edging fingers being similarly indicated at 16 in said figures) are best understood by reference to Figs. 10, 11, and 12. The shaft 17, one of which runs longitudinally of the machine at each side driven as hereinafter explained, is supported in bearing brackets 18 on upper cross pieces 19 of the frame 1 and has splined thereon in each instance a pulley 20. Mounted to rock independently on this shaft adjacent to and spanning the pulley 20 is a yoke 21 at the lower end of which are bearing plates 22 carrying a shaft 23 on which turns a companion pulley 24. These bearing plates 22 have adjustable slot and bolt connections 25 with the yoke arm 21 whereby, under the influence of a jack screw 26, they may be adjusted on the yoke to loosen or tighten a belt 27 that runs over both pulleys and is driven by pulley 20. The lower reach 28 of the belt 27 runs in the direction of the arrows transversely of and above the runway trough 2 at an inclination as shown clearly in Fig. 10. The bracket board 3 of the trough is cut away at 29 to admit it in the exact spaced relationship to the belt 4 on the opposite side of the trough 2 to cause it to contact only with righted apples of just the size intended for the adjacent grade receiving table which, in Fig. 10, is table A. The contact of the belt with the apple ejects it upwardly and laterally onto the table.

As before stated, these successive selectors 15 are successively adjusted to different relationships relatively to the trough or runway and the belt thereon to progressively select and eject apples of diameters running from large to small. The adjusting means embodies an extension 30 on the opposite side of the shaft 17 carrying a jack screw 31 cooperating also with a bracket 32 on cross piece 19 of the frame 1. It is obvious that through this instrumentality the yoke 21, pulley 24 and belt 27—28 may be swung on the axis of pulley 20, namely the shaft 17, to maintain a predetermined point of contact of the reach 28 of the belt with the fruit.

It is to be noted in this connection that the pulleys 20 and 24 are on opposite sides of the runway or trough 2 so that they are removed from the vicinity of the point of contact of the reach 28 of the belt with the apples. Nevertheless, I make this contact positive and definite through the provision of a shoe 33 on the yoke 21 over which the belt travels definitely in its intended plane and which backs up the belt to prevent it from yielding in its contact with the apple. This, however, does not produce any bruising effect because of another provision that I make in the arrangement of the parts which constitutes a feature of my present invention. This consists in always maintaining the ejecting reach 28 of the belt in a plane which diverges in the direction of travel of the belt with respect to the opposite wall of the runway 2 and the belt 4 thereon between which belt 4 and belt 28 the apple must issue. Were the opposite the case the apple would be jammed, crowded and bruised but as it is it frees itself with one jump the moment the selector belt touches it. The progressive contacts of the ejector belts with the apples of the different sizes A, B, C and D are illustrated structurally in Fig. 11 and diagrammatically in the collective view of Fig. 12.

Turning now to the general construction of the machine and the manner in which the instrumentalities described are operated or driven, the prime mover (Figs. 1, 3 and 5) is a motor 34 arranged beneath the support or framework 1 and driving, through a belt 35, a jack shaft 36 at the delivery end of the machine. Through sprockets 37 and 38 and a sprocket chain 39 this jack shaft drives a shaft 40 upon which are secured the driving pulleys 5 of the apple conveying belts 4. A sprocket 41 on shaft 40 is connected by a sprocket chain 42 to a central transverse shaft 43 carrying a pulley 44 that is the driving means of a belt 45 running thereover and over an idle pulley 46 at the feed end of the machine. The upper reach of this belt 45, travelling in the direction of the arrow, rides on the bottom of the runway E suitably supported on the cross pieces 7 of the frame to run centrally down its middle. This constitutes a conveyor for carrying away to the delivery end of the machine, where they are suitably received by an appropriate container, the culls that are preliminarily picked out by hand and thrown therein.

Also secured to the shaft 43 is a crank arm 47 (Fig. 5) connected by a pitman 48 to the frame 13 of the up-edging fingers 10—11—12 to effect the oscillation thereof for the purpose hereinbefore described.

The jack shaft 36 is also connected by pulleys 49 and 50 and a belt 51 to drive an upper shaft 52 having bearings 53 in the frame 1. Bevel gears 54 on this shaft mesh with bevel gears 55 on the ends of the selector shafts 17 to simultaneously drive the selector elements 15 including pulleys 20 and ejecting belts 27.

The apples may be introduced at the receiving end of the machine, namely the right hand end in the figures, to find their way into the runway troughs 2 and onto the belts 4 therein in any suitable manner. In the present instance, I provide a receiving table 56 sloping toward the runways 2 and upon which the apples are dumped from a suitable chute 57. A V-shaped baffle 58 prevents them from entering the cull runway E though the projecting portion of the cull conveying belt 45 may be utilized to agitate them and cause them to divide and roll into the sorting runways 2 at either side.

It will be noticed particularly from an inspection of Fig. 11 of the drawings that the belt 28 is quite a little wider than the face of the pulleys 20 and 24, that is, the driving faces with which the belt comes in contact. This is for the purpose of giving a little leeway through the yielding of the belt at the edge thereof which is advanced toward the incoming path of the apple so that it will not be jammed initially by the belt on first contact so that if the apple is of slightly greater diameter than the spacing of the belt which is adjusted for the largest or next largest size it will not, in its ejection thereof, cramp or bruise the apple.

I claim as my invention:

1. A means for up-edging apples for selection according to their size on their greatest diameters comprising a runway, means for propelling apples therealong, a thin yielding tongue projecting longitudinally of the runway above the same adapted to press down upon the apples until they roll upon their greatest circumferences, and means for vibrating the tongue in a reciprocatory manner in a direction longitudinally of the path of travel of the apples.

2. A means for up-edging apples for selection according to their size on their greatest diameters comprising a runway, means for propelling apples therealong, and a plurality of thin, yielding, overlapping tongues of relatively different lengths projecting longitudinally of the runway above the same adapted to press down upon the apples until they roll upon their greatest circumferences, a shorter tongue being arranged to engage a small apple while an adjacent longer tongue is held therefrom by a large apple.

3. In an apple grading machine, or the like, the combination with a frame, of a runway thereon and a plurality of selectors associated therewith respectively adapted to discharge the apples according to size on their greatest diameters, means for propelling apples along the runway comprising a travelling belt surface associated with a relatively resistant surface, a reciprocatory frame movable in parallelism with the runway, and a plurality of yielding apple engaging elements on the frame, each arranged in advance of one of the selectors and adapted to increase the frictional contact of the apple and cause it to travel on its greatest circumference.

4. In an apple grading machine, or the like, the combination with a frame, of a runway thereon and a plurality of selectors associated therewith respectively adapted to discharge the apples according to size on their greatest diameters, means for propelling apples along the runway comprising a travelling belt surface associated with a relatively resistant surface, a reciprocatory frame movable in parallelism with the runway, and a plurality of yielding apple engaging elements on the frame, each arranged in advance of one of the selectors and adapted to increase the frictional contact of the apple and cause it to travel on its greatest circumference, the said apple engaging elements embodying pliable fingers extending longitudinally of the path of the apples.

5. In an apple grading machine, the combination with a runway along which apples are adapted to be advanced, of a selecting and ejecting device comprising an endless belt arranged to travel transversely of the runway in proximity thereto to contact with apples therein of a certain size, and a backing-up shoe in contact with the inner side of the belt at the point at which its outer side engages the apples.

6. In an apple grading machine, the combination with a runway along which apples are adapted to be advanced, of a selecting and ejecting device comprising an endless belt arranged to travel transversely of the runway in proximity thereto to contact with apples therein of a certain size, and a backing-up shoe in contact with the inner side of the belt at the point at which its outer side engages the apples, such apple contacting run of the belt being divergent in the direction of its travel with respect to the opposite wall of the runway.

7. In an apple grading machine, the combination with a runway along which apples are adapted to be advanced, of a selecting and ejecting device comprising an endless belt arranged to travel transversely of the runway in proximity thereto to contact with apples therein of a certain size, and supporting pulleys for the belt arranged on opposite sides of the runway at substantial distances from the point at which fruit on said runway would contact with said belt.

8. In an apple grading machine, the combination with a runway along which apples are adapted to be advanced, of a selecting and ejecting device comprising a pair of pulleys and an endless belt running thereon and arranged to travel transversely of the runway in proximity thereto to contact with apples therein of a certain size, the belt being wider than the pulley face so as to be yielding at its edge for the purposes set forth.

ALLEN H. McINTYRE.